United States Patent Office 2,959,746
Patented Nov. 8, 1960

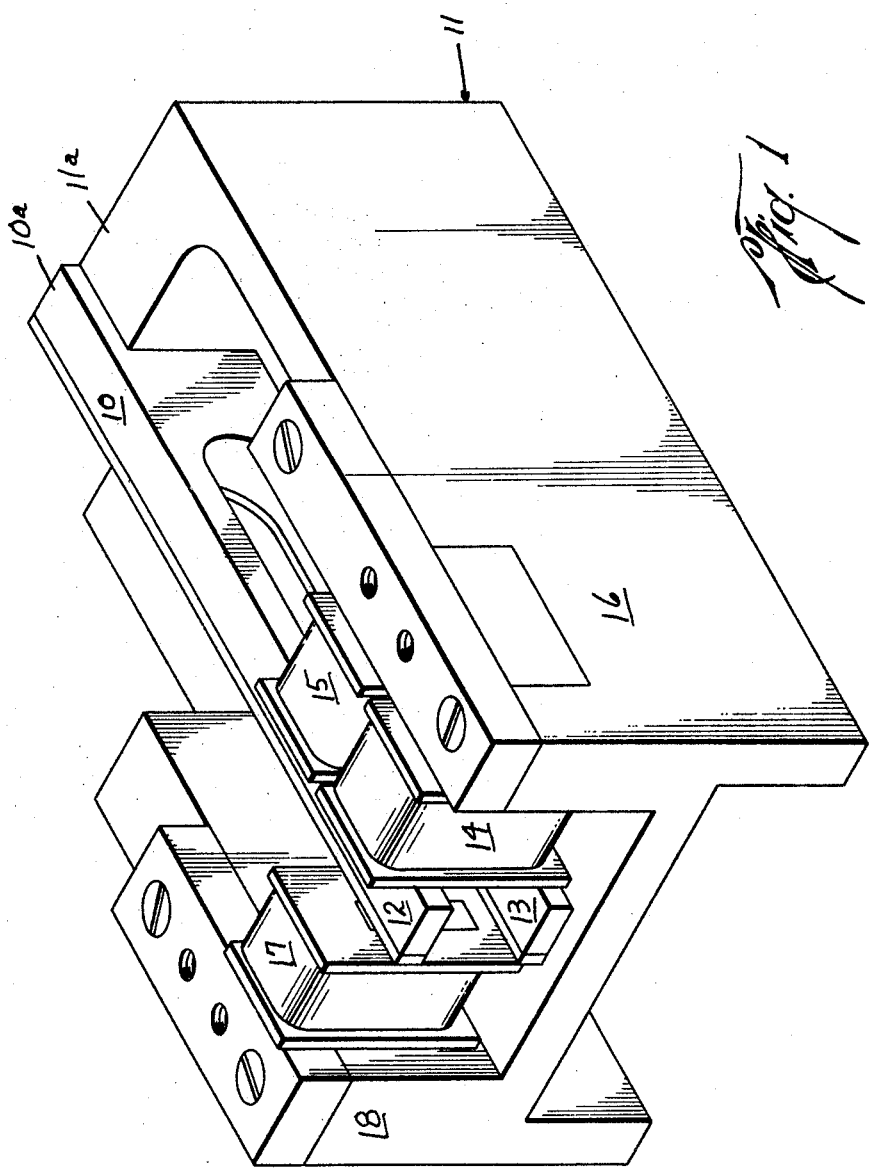

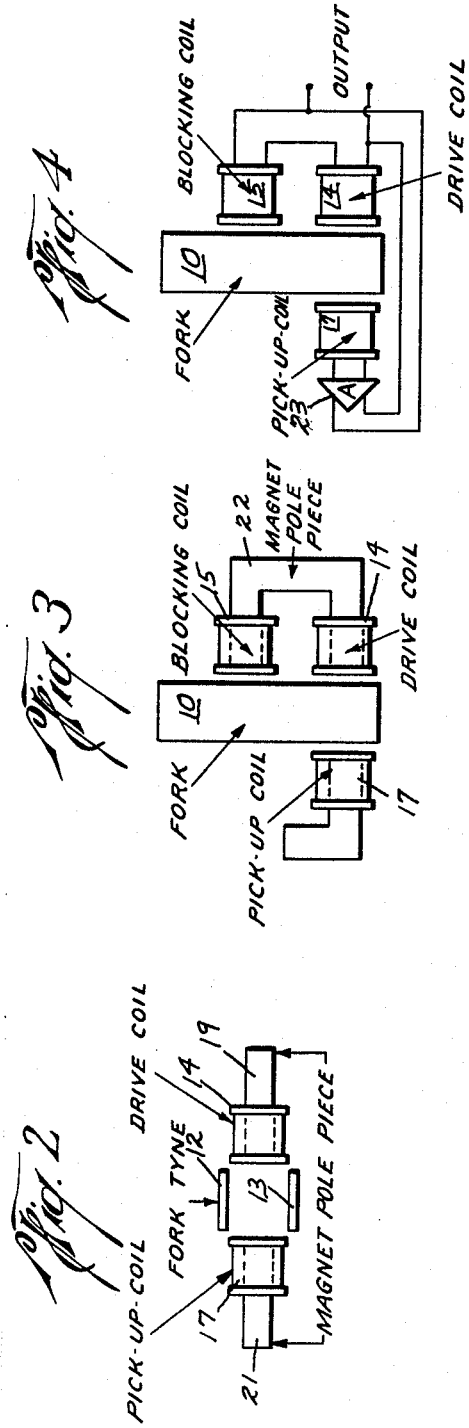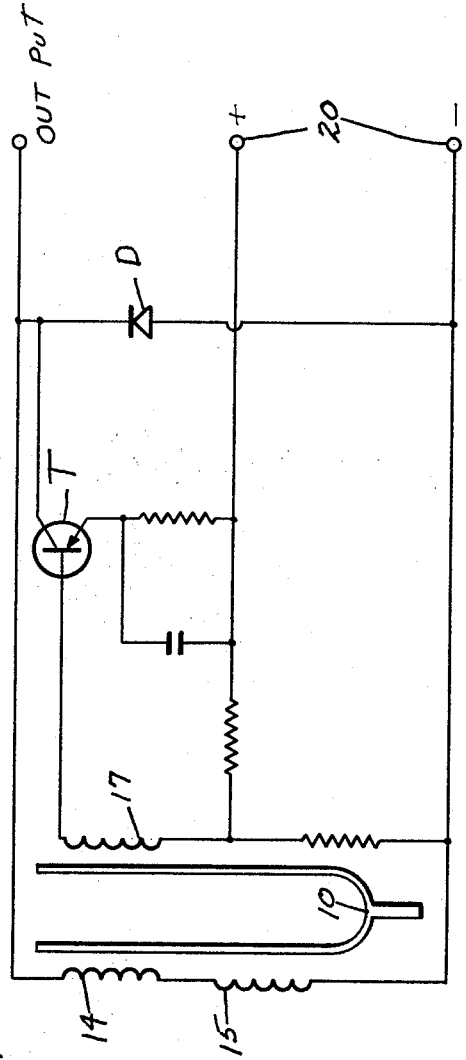

2,959,746
TUNING FORK FREQUENCY STANDARD HAVING A BLOCKING COIL IN ENERGIZING CIRCUIT

James G. Sears, 2422 Branard, Houston, Tex.

Filed Mar. 28, 1958, Ser. No. 724,588

5 Claims. (Cl. 331—116)

This invention relates to frequency standards and more particularly to a new way of associating the drive and pickup coils with the tines of the tuning fork. In one important aspect, it relates to an arrangement which will reduce or eliminate the tendency of the drive and pickup coils to act as a free-running oscillator.

In the past the drive and pickup coils of frequency standards have been placed in a plane which passes through both tines of the tuning fork. The coils have been placed on the opposite side of the fork and outside of the tines and have been placed within the tines of the fork. Each of these methods has one or more critical problems associated with its use.

This invention permits the utilization of the best features of each of these known systems and minimizes the weakness of each. In accordance with this invention, the pickup and drive coils are mounted in the same plane with each other with their magnetic poles facing each other. The magnets are mounted in such manner that they tend to face inside and to be mechanically centered between the tines of the tuning fork. In other words, they are centered on a plane which extends between and equidistant from the tines of the fork. This method of mounting permits each tine to be driven simultaneously and with the same degree of force. In like manner the tines act on the field of the pickup coil simultaneously in the same manner. Preferably the coils are centered on a line and, therefore, are equidistant from the base or from the ends of each tine. This permits drive and pickup from the same frequency node of the fork.

With the drive and pickup magnets of opposite polarity, there is a tendency for the circuit to oscillate, and by this invention there is provided a blocking coil which opposes the effect of a sufficient amount of the flux between the drive and pickup coils to subdue or prevent the tendency of the drive circuit to operate as a free-running oscillator.

It is an object of this invention to provide a frequency standard which permits utilization of the best features of the old outside and inside drives while minimizing the weakness of each.

Another object is to provide a frequency standard device in which the drive and pickup takes place on the same frequency node of both tines of the fork.

Another object is to provide a frequency standard device in which both tines of the fork are driven simultaneously and the driven tines drive a pickup coil all from the same frequency node of the fork.

Another object is to provide a frequency standard device in which both tines are driven simultaneously and in which both the drive and pickup flux fields may be located immediately adjacent the ends of the tines.

Another object is to provide a frequency standard in which the adjacent ends of the drive and driven coil are of opposite polarity and in which the tendency of this arrangement to provide a free-running oscillator is eliminated.

Other objects, features and advantages of this invention will be apparent from the drawings, the specification and the claims.

In the drawings wherein like reference numerals indicate like parts and wherein there is shown by way of illustration one embodiment of this invention;

Figure 1 is a perspective view of a frequency standard device constructed in accordance with this invention minus the amplifying means and associate circuitry;

Figure 2 is an end view of the tuning fork and the associated pickup and drive coils;

Figure 3 is a plan view of the tuning fork and associated pickup, drive and blocking coils;

Figure 4 is a diagrammatic representation of the fork, coils and associated amplifier and circuitry; and Figure 5 is a diagrammatic representation of a preferred circuit utilizing this invention. It should be noted that the tuning fork is shown rotating 90° from its true position.

Referring first to Figure 1, the tuning fork 10 and the asosciated coils are shown to be mounted in a base 11. Positioning of the several components is done with care and the base 11 should be carefully machined so that when the tuning fork and associated coils are secured in place, the proper positioning of these elements will be insured.

The tuning fork is secured to the base by a fastening means which is hidden in Figure 1 but which fastens the base 10a of the fork to the upstanding wall 11a of the base. In this manner the two tines 12 and 13 of the fork 10 are permitted to vibrate freely.

The driving coil 14 and the blocking coil 15 are carried in the wall support 16 of base 11. In like manner the pickup coil 17 is supported on the wall portion 18 of base 11.

The drive coil is mounted in such a way that its flux field is equally effective on both of the tines. In like manner the pickup coil is mounted so that its flux field will be affected equally by both of the tines. Preferably the mounting is such that the frequency node affected by the drive coil is the node which affects the pickup coil. In other words, the flux fields of the drive and pickup coils are spaced equidistant from the base or the ends of the tines of the tuning fork.

While any desired type of drive and pickup coils may be utilized, it is preferred to provide coils having permanent magnet cores such as core 19 about which the drive coil 14 is wound and core 21 about which the pickup coil 17 is wound.

In order to drive the two tines 12 and 13 with the same force at the same frequency node, the drive coil is positioned with one end of core 19 adjacent one side of the tuning fork and midway between the two tines 12 and 13 so that the force exerted on the tines will be equal. Preferably the core 19 extends along a plane extending transverse of the tuning fork and equidistant from each of the tines. This insures that the flux field on each tine will be equal. While the pole piece should be centered as closely as possible between the tines to provide for equal forces on the tines, it is apparent that the pole piece could be moved along its longitudinal axis without disturbing this relationship.

The pickup coil is arranged geometrically in the same manner as the drive coil with its core 21 immediately opposite core 19 of the drive coil as best shown in Figure 3. Its relationship with the tuning fork and operation is the same as the drive coil except that it is driven by the tines cutting its flux field.

It is of course advantageous to drive the pickup coil from the same frequency node which is driven by the driving coil, and for this reason the pickup coil is positioned immediately opposite the drive coil. In other words, the cores 19 and 21 as well as being arranged along a plane which extends between the two tines are also arranged along substantially the same axis or a line extending through the tines of the fork and equidistant from each tine. This line extends transversely of the tines and is preferably perpendicular to the longitudinal axis of the tuning fork.

From the explanation as it has thus far progressed, it is apparent that energizing the driving coil will modulate lines of flux in the coil which will act on both tines 12 and 13 simultaneously and with equal force and cause them to vibrate. As these tines vibrate, they will act on the flux field of core 21. As the tines cut the lines of flux of the permanent magnet 21, a signal will be induced in the pickup coil 17. As the same frequency node of the tuning fork on both tines is utilized by the drive and pickup coils, the tuning fork will be in dynamic balance and many of the problems associated with inside and outside drive will be eliminated.

The adjacent poles of the drive and pickup coils are preferably in phase, that is of opposed polarity. This arrangement gives rise to a tendency between these two coils to act as a free-running oscillator or hum. This is only of consequence in starting up the device, but it is desirable that it be eliminated. After the tines are vibrating at full magnitude, the free-running oscillating characteristics of the drive and pickup coil are of no consequence and, therefore, the device may be used without the blocking coil 15. It is preferred, however, to eliminate the hum entirely with a hum-bucking device such as coil 15.

The blocking coil may be a separate coil subjected to the same signal as the drive coil and designed to be 180° out of phase with the pickup coil. As the drive coil is in phase with the pickup coil, the net magnetic force between the drive and blocking coil on the one hand and the pickup coil on the other would be zero, if the pickup coil were spaced on the centerline between the blocking and drive coils. The above assumes the inductance of the blocking and drive coils to be equal. In other words, if the adjacent poles of the drive and pickup coil be opposites, the flux therebetween will attract. If the adjacent poles between the pickup coil and blocking coil be likes, they will repel, and if the pickup coil is on the centerline between the blocking and drive coil, the resultant force is zero.

In order to drive and pick up from the same frequency node, it is preferred to place the pickup coil immediately opposite the drive coil. However, it has been found that the blocking coil, when placed as indicated in Figure 3 and out of phase with the pickup coil, will cancel out sufficient of the in phase flux component between the drive and pickup coil to eliminate oscillation. Of course if desired, the blocking coil might be designed to exert a slightly greater force than the driving coil to block out still more of the in phase flux component.

The design and arrangement of the blocking coil should be such as to not materially interfere with vibration of the tuning fork. For this purpose, the blocking coil may be provided with a greater gap than the drive coil relative to the tuning fork. However, it has been found that this is not necessary as a practical matter, and if the blocking coil is positioned with its magnetic core 22 centered along a plane passing through and equidistant from the tines 12 and 13 in the same manner as the driving coil, then the force on the tines from the blocking coil flux can be tolerated. Of course if the blocking coil were not centered, the flux would not act in equal increments on the tines and some interference with dynamic balance would result. The reason the blocking coil flux may be tolerated is that the blocking coil is inboard or on the base side of the driving coil. The moment arm between the base and the point of application of force by the driving coil is much longer than the moment arm between the base and point of application of force by the blocking coil.

While two separate coils might be used to provide the driving and blocking coils, it is preferred to provide a common U-shaped core for these two coils, as this will increase the amount of flux passing through the driving coil.

The tuning fork and coils may be associated with any desired circuit which will drive the tuning fork. In Figure 4, conventional circuitry for this type of standard frequency controlling device is illustrated. Signals from the pickup coil 17 are amplified in the amplifier 23. The amplified signals are then fed into the drive coil 14 to drive the fork. These signals also pass through the blocking coil, which may be hooked into the circuit either in series or in parallel for the purposes explained above. The amplified signal will quickly bring the fork up to maximum magnitude of vibration. The device may be used in the conventional manner to provide a time base in navigational systems, control the driving speed of motors in recording systems, servo systems, etc.

In Figure 5, there is shown a preferred circuit for driving the tuning fork of Figure 1. A direct current from source 20 provides both a collector current and a base current to operate the transistor T. Signals generated in the pickup coil 17 by vibration of the tuning fork are amplified in the transistor T and then fed to the driving and blocking coils 14 and 15 to drive the tuning fork. Preferably the voltage of this driving signal is maintained constant, and for this purpose either the direct current supply may be provided with suitable means to supply a steady voltage, or the Zener diode D may be shunted across the drive and blocking coils which will limit the voltage of the amplified signal to give the desired result. A more complete description of the operation of the circuit shown in Figure 5 is given in my co-pending application, Serial No. 724,589, filed March 28, 1958.

The above explained method of mounting the coils in relation to the tines of the tuning fork give rise to the following principal advantages: (1) Drive and pickup take place on the same frequency node of the tuning fork; (2) harmonic drive problems are minimized by eliminating separate points for drive and pickup; (3) fork dampening problems are minimized by applying drive to both tines and taking pickup from both tines; (4) the use of this invention makes gapping non-critical, and (5) the use of this invention permits the setting of the magnets to any degree of coupling to the fork desired.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A frequency standard comprising, a tuning fork, a drive coil on one side of the fork, a pickup coil on the opposite side of the fork, and a blocking coil connected in a common energizing circuit with the driving coil and being 180° out of phase with the pickup coil thereby opposing sufficient of the in phase flux between the drive and pickup coils to prevent free running oscillation therebetween.

2. A frequency standard comprising, a tuning fork, a drive coil and a pickup coil on opposite sides of the fork and substantially centered on a line extending transversely of the fork and between and equidistant from the tines of the fork, and a blocking coil connected in a common energizing circuit with the driving coil and being 180° out of phase with the pickup coil thereby opposing sufficient of the in phase flux between the drive and pickup coils to prevent free running oscillation therebetween.

3. A frequency standard comprising, a tuning fork, a pickup coil on one side of the fork, a drive coil on the other side of the fork, and a blocking coil connected in a common energizing circuit with the driving coil and being 180° out of phase with one of the pickup and drive coils thereby opposing sufficient of the in phase flux between the drive and pickup coils to prevent free running oscillation therebetween.

4. A frequency standard comprising, a tuning fork, a drive coil on one side of the fork, a pickup coil on the opposite side of the fork, said drive and pickup coils being positioned equidistant from the base of the fork, and a blocking coil 180° out of phase with the pickup coil and opposing sufficient of the in-phase flux between the drive and pickup coils to prevent oscillation therebetween, said blocking coil being adjacent to and on the base side of the driving coil.

5. A frequency standard comprising, a tuning fork, a drive coil and a pickup coil on opposite sides of the fork and substantially centered on a line extending transversely of the fork and between and equidistant from the tines of the fork, and a blocking coil 180° out of phase with the pickup coil and opposing sufficient of the in phase flux between the drive and pickup coils to prevent oscillation therebetween, said blocking coil being positioned on the same side of the fork as the drive coil and on the base side of the drive coil.

References Cited in the file of this patent

UNITED STATES PATENTS

| | | |
|---|---|---|
| 1,702,568 | Marrison | Feb. 19, 1929 |
| 2,147,492 | Mead | Feb. 14, 1939 |
| 2,222,688 | Rumpel | Nov. 26, 1940 |